US006819629B2

(12) United States Patent
Cummings et al.

(10) Patent No.: US 6,819,629 B2
(45) Date of Patent: Nov. 16, 2004

(54) METHOD FOR DISTINGUISHING RETURN ECHOES FROM NOISE

(75) Inventors: Duane E. Cummings, Monticello, MN (US); Raphael J. Marzean, St. Michael, MN (US); Paul W. Thorne, Ham Lake, MN (US)

(73) Assignee: MarCum Technologies, Inc., Anoka, MN (US)

( * ) Notice: Subject to any disclaimer, the term of this patent is extended or adjusted under 35 U.S.C. 154(b) by 0 days.

(21) Appl. No.: 10/413,120

(22) Filed: Apr. 14, 2003

(65) Prior Publication Data

US 2004/0202048 A1 Oct. 14, 2004

(51) Int. Cl.[7] .............................................. G01S 15/96
(52) U.S. Cl. ....................................................... 367/98
(58) Field of Search .............................. 367/98, 99, 901

(56) References Cited

U.S. PATENT DOCUMENTS

| 4,845,682 A | * | 7/1989 | Boozer et al. ................ 367/93 |
| 5,260,912 A | * | 11/1993 | Latham ....................... 367/98 |
| 5,459,479 A | | 10/1995 | Cummings .................. 367/108 |
| 5,999,490 A | | 12/1999 | Shimauchi et al. ......... 367/111 |

* cited by examiner

Primary Examiner—Daniel Pihulic
(74) Attorney, Agent, or Firm—Thomas J. Nikolai; Nikolai & Mersereau, P.A.

(57) ABSTRACT

The present invention separates noise from actual return echoes of ultrasonic sound waves generated by the transducer of a sonar type fish finder by comparing the timing of generated ultrasonic pulses and received signals and disregarding signals when such timing does not match.

4 Claims, 3 Drawing Sheets

METHOD FOR DISTINGUISHING RETURN ECHOES FROM NOISE

BACKGROUND OF THE INVENTION

I. Field of the Invention

The present invention relates to sonar equipment used by fishermen to detect the depth of the water and the depth of objects in the water such as swimming fish. More specifically, the present invention relates to such sonar equipment with a noise canceling software to eliminate signals received from other sonar devices.

II. Related Art

Prior art sonar equipment used as fish finders typically include a controller which is coupled to an oscillator, a receiver and a display. The oscillator and receiver are both coupled to a transducer. In operation, the controller controls the oscillator which, in turn, causes the transducer to transmit ultrasonic pulses throughout the water. When these pulses reach an object such as the bottom or a swimming fish, they reflect off the object as return echoes back to the transducer. When the transducer receives such a signal, it forwards the signal to the receiver which amplifies the received signal, converts it from an analog to a digital signal and forwards the digital signal to the controller. The controller is able to gauge the distance between the transducer and the object because it knows when the transducer generated the ultrasonic pulse, knows when the transducer detected the return echo and knows the speed at which ultrasonic pulses propagate through the water. The controller can then display the depth information on the display in any number of well known ways.

Systems of the type described above work well if there are no other sonar systems operating in the vicinity. If other sonars are operating in close proximity to each other, they can interfere with each other. Specifically, pulses or return echoes of such pulses generated by one can be inadvertently detected by the other, leading to confusion regarding the depth of the water or the depth of fish in the water. Thus, there is a real need for a low cost way of filtering the signals so that the equipment can distinguish between return echoes of pulses it generates from all other signals it receives from other sources.

SUMMARY OF THE INVENTION

The object of the present invention is to provide a mechanism by which a fish finder can distinguish between return echoes of pulses it generates from other signals it detects.

Another object of the present invention is to provide such a mechanism that is effective in filtering out noise and yet does not substantially increase the cost of the fish finder.

Still another object of the present invention is to provide such a filter mechanism that will not interfere with the operation of other sonar equipment operating in the vicinity.

To achieve these and other objects of the invention, the controller controls the oscillator so that the transducer produces ultrasonic pulses at a known rate different from the rate at which pulses are generated by other units in the area. As signals are detected by the transducer, they are processed by the receiver and controller. This processing includes correlation between the timing of signals received after one pulse with the timing of signals received after the next pulse. If the timing is not coherent, the controller assumes that the received signal is not an echo return of a pulse generated by the unit, but instead is noise generated by another source. The system of the present invention allows the user to select from a variety of pulse rates so that the unit can operate at a rate different than other units in the area that can produce noise, i.e. interfering signals.

DETAILED DESCRIPTION

Figure 1:
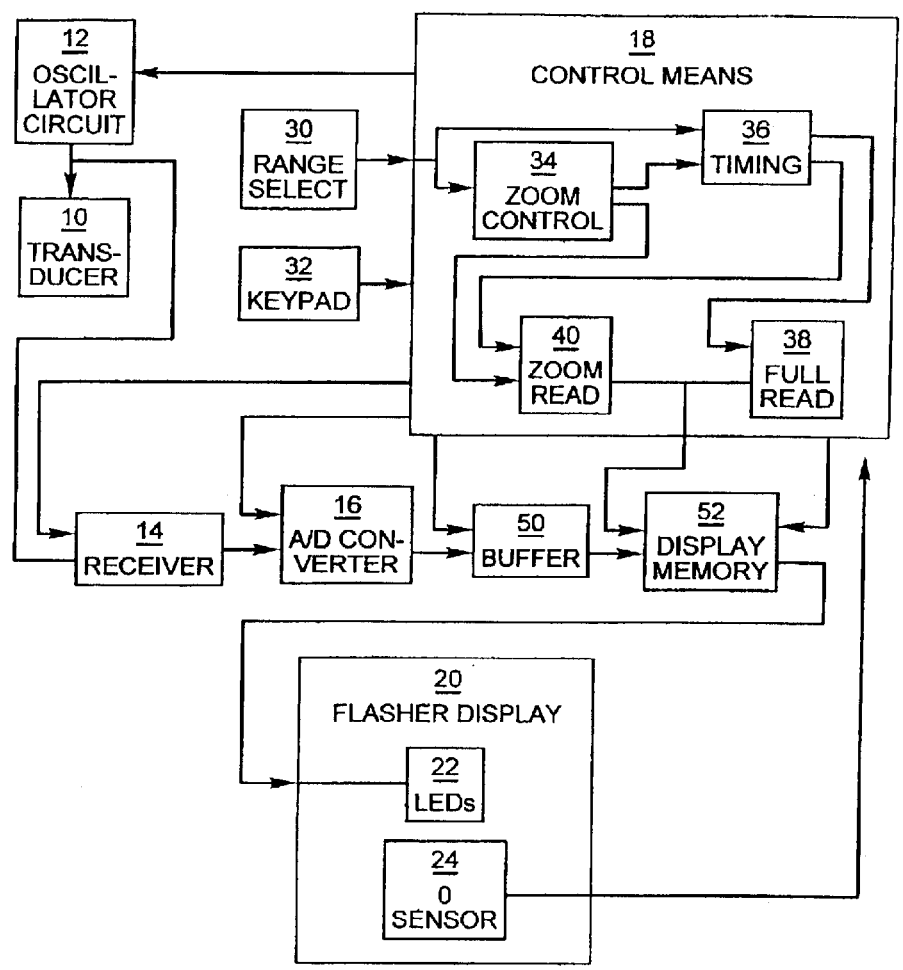
FIG. 1 is a block diagram of a fish finder made in accordance with the present invention.

As shown in FIG. 1, the fish finder of the present invention includes a controller 18. Coupled to the controller are a range select switch 30 and keypad 32 for entry of user selectable parameters and a display 20 for displaying data under process control by the controller 18. Also coupled to the controller 18 are an oscillator 12 and a receiver 14, both of which are coupled to a transducer 10.

In operation, the controller 18 sends a control signal to the oscillator 12. The oscillator 12 responds by causing the transducer 10 to generate ultrasonic pulses at a preselected interval. As these pulses contact objects in the water (such as the bottom of the body of water or fish swimming in the water), the ultrasonic pulses bounce off the object and return to the transducer 10 as "return echoes". The transducer is capable of sensing the return echoes and forwarding to the receiver 14 analog signals representative of the return echoes. The receiver 14 amplifies these signals, converts them to digital signals (alternatively, a separate analog-to-digital converter 16 can be provided), and forwards the digital signals to the buffer 50 and memory 52 governed by the control means 18.

Those skilled in the art will immediately recognize that the transducer 10 and receiver 14 are incapable of distinguishing between return echoes and ultrasonic noise from other sources such as other fish finder units. However, the controller 18 is programmed to distinguish between such signals and filter out any digital signals it receives that do not correspond to return echoes. The manner in which the filtering is performed will now be discussed with reference to FIGS. 2–4.

The filtering technique of the present invention contemplates that the transducer 10 of the fish finder of the present invention generates ultrasonic pulses at a rate that is different from other noise generating equipment operating in the area. The user can manipulate the keypad 32 to select the rate at which the transducer 10 generates such pulses.

Figure 2:
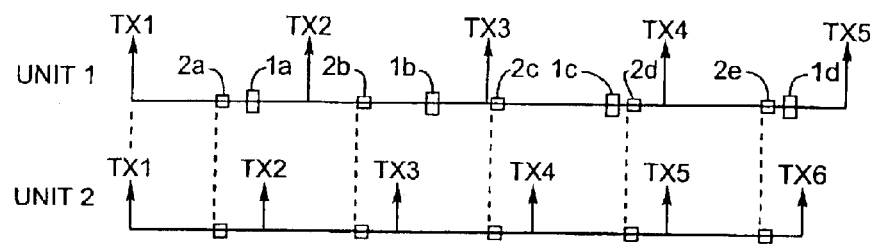
FIG. 2 is a schematic diagram comparing the timing of operation of two different fish finders.
Figure 3:
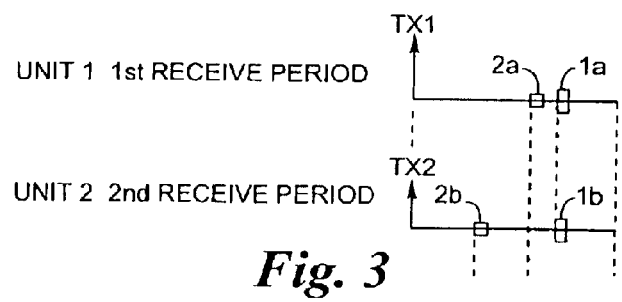
FIG. 3 is a diagram comparing the timing of received signals with respect to two sequential pulses generated by a fish finder made in accordance with the present invention.
Figure 4:
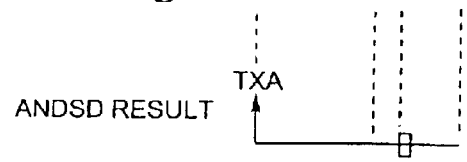
FIG. 4 is a diagram comparing the timing of signals received after sequential pulses made by the fish finder.

In the example reflected in FIGS. 2–4, it is assumed that two fish finder units, a unit 1 incorporating the present invention and a unit 2 which may or may not incorporate the present invention, are operating in the area. As shown in FIG. 2, unit 1 transmits pulses (TX1 through TX5) at a first fixed rate. Similarly, unit 2 is generating pulses TX1 through TX6 at a different fixed rate. FIG. 2 also shows that unit 1 is detecting two sets of ultrasonic pulses (1a through 1d and 2a through 2e). The present invention allows unit 1 to distinguish between those ultrasonic pulses which are actual return echoes of the ultrasonic pulses generated by unit 1 and those which are noise generated by unit 2.

When the filtering system of the present invention is used with respect to unit 1, comparisons of the type shown in FIG.

3 are performed by the controller 18. Specifically, the controller 18 will determine that signals 1a and 1b are representative of actual return echoes because each was received at the same time after an ultrasonic pulse (TX1 or TX2) was transmitted by the transducer 10. However, the controller 18 will assume that the signals 2a and 2b are noise and not return echoes because they were detected at a different time after the generation of pulses TX1 and TX2 by the transducer 10 of unit 1. The controller 18 will treat signals 2a and 2b as noise and filter them out rather than report them on the display 20.

FIGS. 2–4 show the mechanism for filtering noise in its simplest form. In FIG. 3, the timing comparisons only involves signals received after two pulses are generated by the transducer of unit 1. For greater accuracy, it may be desirable to perform this timing comparison for signals received after each of a larger number of pulses are generated by the transducer of unit 1.

As suggested from the foregoing, it is possible for the user of unit 1 to select the rate at which pulses are generated by unit 1. The use can also select whether the comparison shown in FIG. 3 or some other comparison involving return signals received after a greater number of pulses is used. The user can also select whether there must be a timing match after all of the selected numbers of pulses are generated or after two or more of said pulses are generated. For example, the user can select to have the controller perform the correlation for the receive periods of each of four pulses, but only filter out signals where there was a timing match in less than three of the four receive periods.

Figure 5:
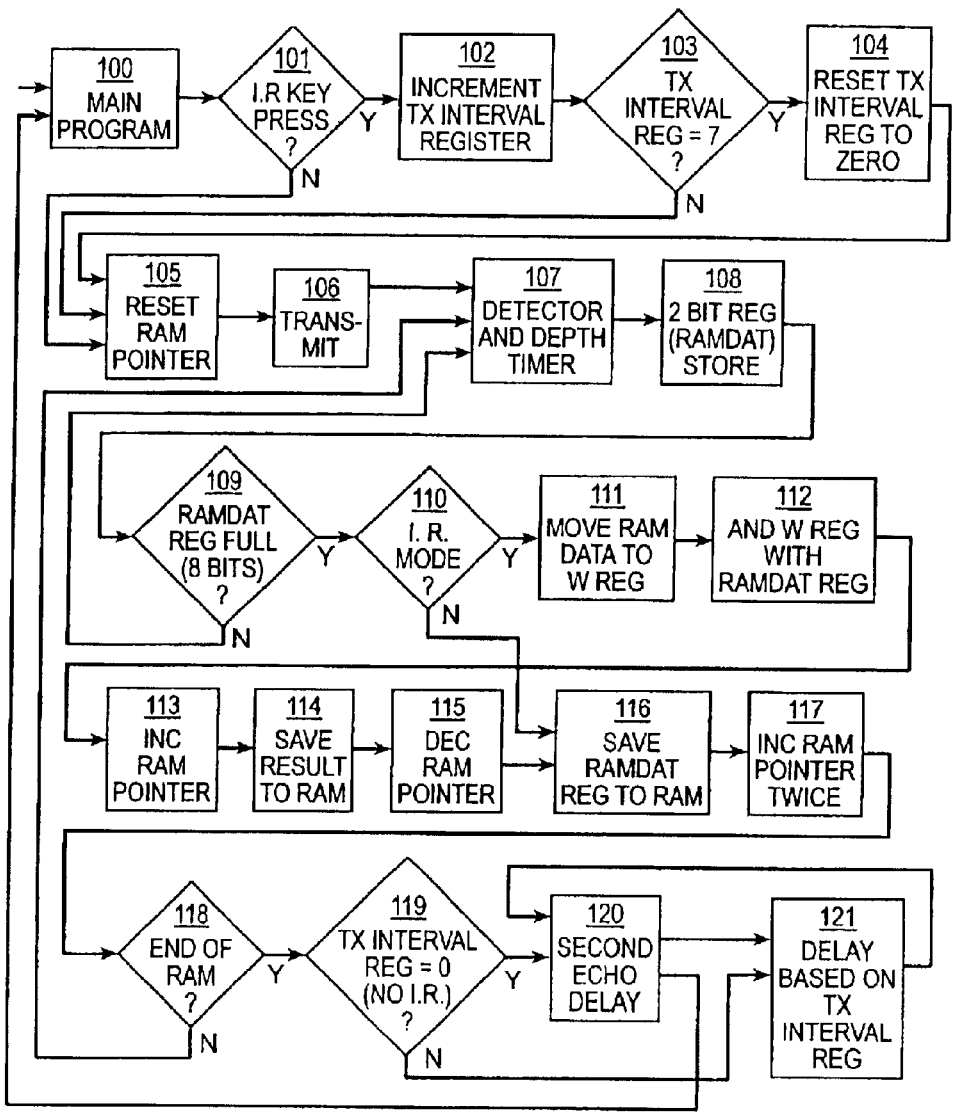
FIG. 5 is a flow chart showing the manner in which the software of the present invention operates to filter out signals from other sources based upon the mechanism contemplated by FIGS. 2 and 3.

FIG. 5 is a flow chart showing the manner in which the controller 18 processes the data to filter out noise in the manner shown in FIGS. 2–4. The main program 100 first checks to see if the user has actuated interference rejection key 101 to activate the interference rejection feature of the invention. As shown, the user can then select from seven different intervals at which the controller will cause the transducer to generate ultrasonic pulses. Steps 102–104 are used by the system to determine the desired interval and save this in a transmit interval register for later use by the system. At step 105, a ram pointer is reset to indicate where data received after the next transmission of an ultrasonic pulse is to be stored.

An ultrasonic pulse is then transmitted by the unit at step 106. The detector and depth timer 107 then watch for signals to be detected by the transducer. When signals are detected, data reflecting the depth and the strength of the signal are stored in a RAMDAT register at step 108. At step 109, the system checks to see if RAMDAT register 108 is full. If not, the program cycles back through steps 107 and 108 until the RAMDAT register is full.

Once the controller determines that the RAMDAT register is full, it again verifies that the unit is in the interference rejection (or noise filtering) mode at step 110. If the unit is in the mode, the data in the RAMDAT register is moved to a working register at 111 and stored there while the transducer issues another ultrasonic pulse at step 106 and the system then cycles through steps 106–110. At step 112, the data generated after the first pulse and stored in the working register is compared with the data generated after the second pulse and stored in the RAMDAT register. At steps 113–116, the ram pointer is incremented and the results derived from step 112 are stored in ram. If the unit is not in the interference rejection mode, the data in the RAMDAT register is stored in ram.

At step 117, the ram pointer is incremented twice. At step 118, the controller checks to see if the ram is full. If the ram is not full, the system cycles back through steps 107–118 until the ram is full. When the ram is full, the controller checks the contents of the transmit interval register at step 119 to see if it contains a 0 indicating the unit is not in the interference mode. If the controller finds a zero, it processes the second echo delay at step 120 and returns to step 100, the beginning of the main program. If the unit is in the interference rejection mode, it sets a first delay at step 121 based upon the selected transmit interval stored in the transmit interval register. An additional delay is added at step 120 to eliminate "double echoes" before returning to step 100. The second echo delay introduced at step 120 prevents the unit from treating an echo reflecting off the bottom of a boat or the bottom of the ice in an ice fishing environment as being a true return echo.

What is claimed is:

1. A method for locating the position of objects in a body of water comprising:
   a. selecting a fixed rate at which ultrasonic pulses are to be generated that is different from the rate of other units within range;
   b. generating a plurality of ultrasonic pulses at said fixed rate, sensing any signals received after generating a first of said ultrasonic pulse and measuring the time interval between said first of said ultrasonic pulses and the sensing of said signals received after said first of said ultrasonic pulse;
   c. sensing any signals received after generating a second of said ultrasonic pulses, and measuring the time interval between said second of said ultrasonic pulses and the sensing of said signals received after said second of said ultrasonic pulses;
   d. comparing the time intervals between said first of said ultrasonic pulse and the sensing of the signals received after said first of said ultrasonic pulses with the time intervals between said second of said ultrasonic pulse and the sensing of signals received after said second of said ultrasonic pulse, to see which of said time intervals match; and
   e. rejecting any signals that do not have time intervals that match as interfering ultrasonic signals.

2. The method of claim 1 further including the steps of:
   a. measuring the time intervals between at least one additional ultrasonic pulse and the sensing of signals received after said at least one additional ultrasonic pulse; and
   b. comparing the time intervals between said at least one additional ultrasonic pulse and the sensing of signals received after said at least one additional ultrasonic pulse with: (i) the time intervals between said first of said ultrasonic pulses and the sensing of the signals received after said first of said ultrasonic pulses; and (ii) the time intervals between said second of said ultrasonic pulses and the sensing of the signals received after said second of said ultrasonic pulses to determine which of said time intervals match.

3. The method of claim 2 further including the step of rejecting any signals that do not have time intervals that match at least one other time interval as interfering ultrasonic signals.

4. The method of claim 2 further including the step of rejecting any signals that do not have time intervals that match at least two other time intervals as interfering ultrasonic signals.

* * * * *